United States Patent [19]
Gold

[11] Patent Number: 5,173,586
[45] Date of Patent: Dec. 22, 1992

[54] ELECTRIC HEATING ATTACHMENT FOR DEICING THE WIPER REST ZONE OF A VEHICLE WINDSHIELD

[76] Inventor: Peter N. Gold, 465 N. Wood Ave., Rockville Centre, N.Y. 11570

[21] Appl. No.: 593,736

[22] Filed: Oct. 5, 1990

[51] Int. Cl.[5] .................. H05B 3/26; E06B 7/00; A47L 1/16; B60S 1/02
[52] U.S. Cl. .................. 219/203; 219/522; 219/542; 219/547; 338/306
[58] Field of Search .............. 219/203, 522, 547, 543, 219/542; 338/308, 309, 306, 307, 310–314

[56] References Cited
U.S. PATENT DOCUMENTS

| | | | |
|---|---|---|---|
| 4,109,133 | 8/1978 | Hanle | 219/203 |
| 4,373,130 | 2/1983 | Krasborn et al. | 219/203 |
| 4,378,484 | 3/1983 | Kunert | 219/203 |
| 4,910,380 | 3/1990 | Reiss et al. | 219/547 |

Primary Examiner—Anthony Bartis

[57] ABSTRACT

An electric heating device for heating and deicing the wiper rest zone of a vehicle windshield includes a resistance heating wire of either circular or rectangular cross-section attached to the exterior surface of the windshield along the lower edge thereof and outside the normal range of vision therethrough by means of an electrically non-conductive tape extending lengthwise of the wire. An arcuate or trapezoidal cross-section layer of electrically non-conductive sealant completely covers the tap and wire to provide water tight encapsulation thereof. The adhesive tape may be 4 provided with holes to allow the sealant to penetrate therethrough and form a mechanical interlock between the tape and windshield. The wiper blade is adapted to contact the sealant layer. The device may also be applied to the lower edge of the rear or side windows of a vehicle to melt ice or snow which may accumulate thereat.

9 Claims, 2 Drawing Sheets

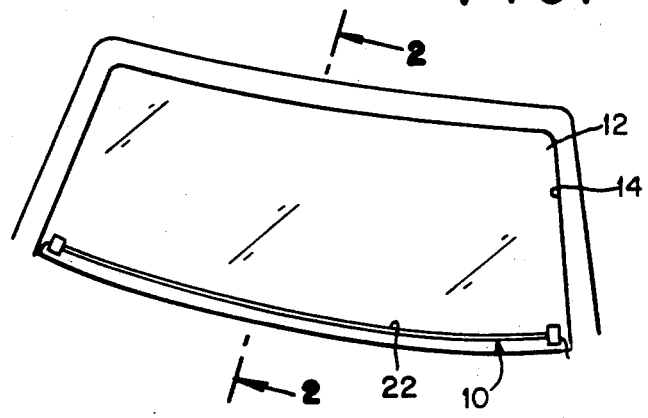
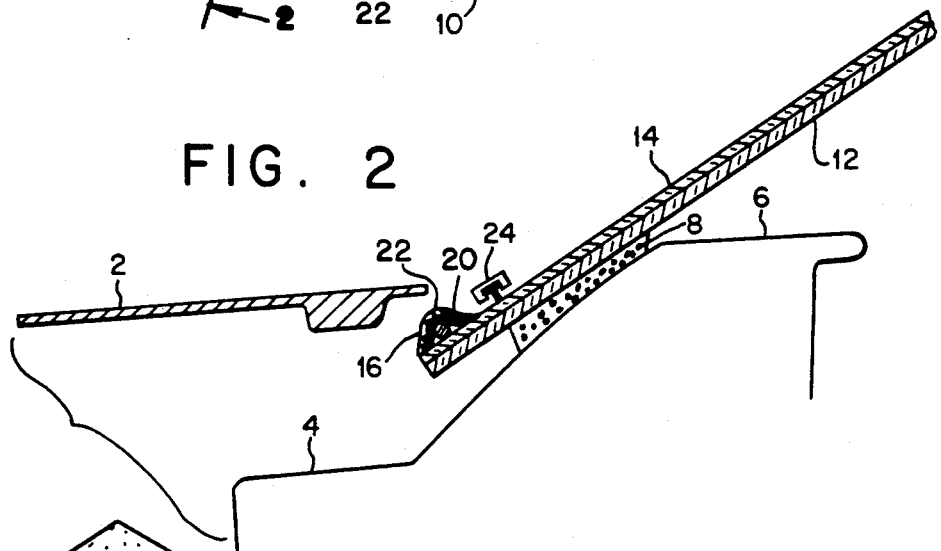
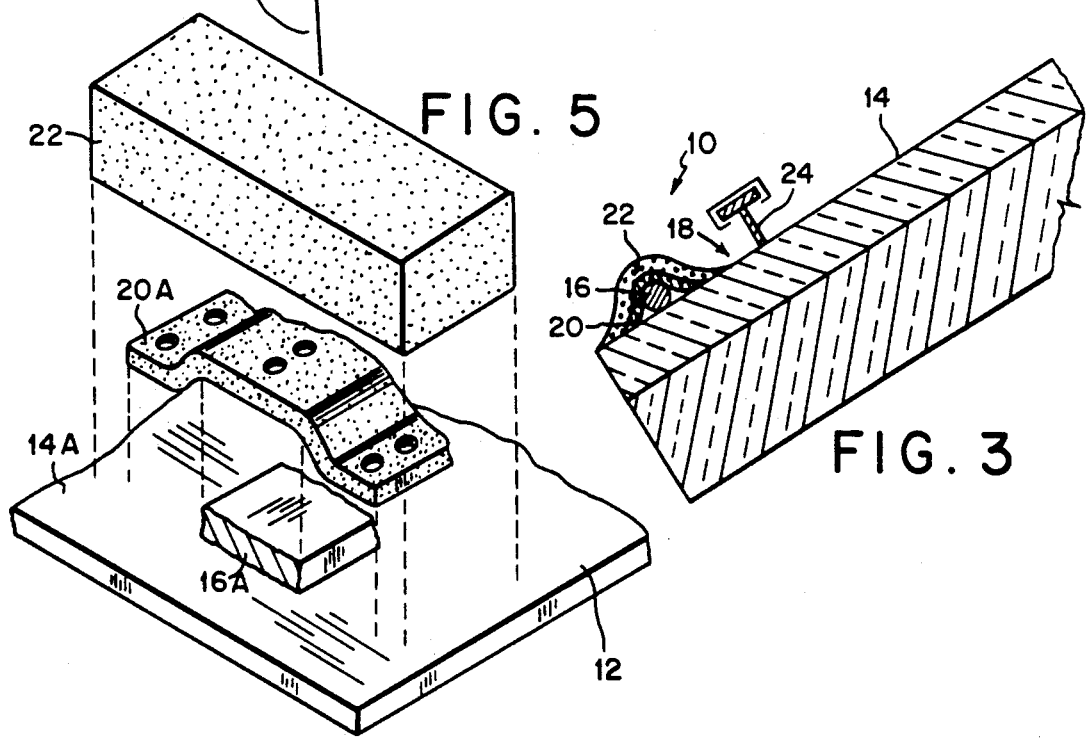

ELECTRIC HEATING ATTACHMENT FOR DEICING THE WIPER REST ZONE OF A VEHICLE WINDSHIELD

BACKGROUND OF THE INVENTION

1. Field of the Invention

The present invention relates to a windshield deicer device that heats the exterior surface of the window glass of an automotive vehicle comprising an electric resistance heating wire adjacent to the exterior surface; an adhesive tape for holding the wire in place; a curable sealant placed over said adhesive tape for providing a water-tight encapsulation of the tape and the wire upon the curing of said sealant. In addition, the adhesive tape may contain holes, so that the sealant penetrates therethrough and forms a mechanical interlock between the tape and the windshield, after the sealant is cured.

2. The Prior Art

A basic safety problem has evolved for vehicles that are left out in snow storms or that are driven in snow storms. The accumulated snow and ice collects on the surface of the windshield prior to the operation of the vehicle and, in many cases, makes it impractical for the windshield wiper to clear the windshield. In fact, it often causes the windshield wiper linkage to be destroyed because of the interference of the accumulated snow on the windshield when the windshield wipers are activated.

To compound matters, as a vehicle is driving during a snow storm, the windshield wiper, via its movement, collects and transfers the accumulated snow to the lower part of the windshield. This excessive build-up of snow interferes with the effective operation of the windshield wipers of the vehicle.

These problems are particularly acute and troublesome for vehicle drivers such as volunteer firemen, snow plow drivers, aircraft pilots, ship captains, and the like, as it interferes with their ability to do their jobs efficiently and safely. Simply put, the volunteer fireman does not have the time to clear his windshield of snow when called to drive his vehicle to a building that is on fire. Similarly, an aircraft pilot does not have the time to clean his windshield off when his air base is being attacked in a snow storm. Also, a snow plow driver does not have the time to stop his vehicle every two minutes to walk outside his snow plow to remove accumulated show from his windshield, side glass, back glass or roof panel.

It has been found that applying electrically conductive material onto the outside of an automobile windshield has many disadvantages. First, it interferes with driver vision. Second, it is exposed to contaminants such as road salt, acid rain, ultra-violet light, which in turn creates greater resistance to the electricity. Third, it is a highly expensive process. Fourth, it is a highly problematic art and is not practical for use over long extended time frames, very often requiring the complete replacement of the entire automotive windshield. Fifth, it cannot effectively be applied after a vehicle leaves a vehicle assembly line. Sixth, it cannot effectively be replaced. In the prior art, any electric heating wires are located between the inner and outer layers of the glass for a laminated windshield or are located on the interior surface of a single layer of tempered or hardened glass found in a vehicle window.

SUMMARY OF THE INVENTION

It is an object of the present invention to provide a deicer device that can be utilized for both a laminated glass windshield, as well as for hardened tempered glass windows.

It is another object of the present invention to apply electric resistance heating to the outside surface of a windshield or to the outside surface of a window door glass to deice the outside surface by melting away the snow and ice so as to prevent interfering with the useful operation of the windshield wiper, or the movement of a moveable side door glass window.

The above objects are accomplished in accordance with the present invention by providing an apparatus for heating and deicing the window glass of an automotive vehicle comprising a vehicle window glass having an exterior surface; an electric resistance heating wire on said exterior surface of said glass and positioned along a zone at which ice or snow would collect if said ice or snow were precipitated onto said glass; an adhesive tape placed over said wire for holding said wire along said location and for attaching said wire to the exterior surface of the glass; and a curable sealant placed over said adhesive tape on said exterior surface of said glass for providing a water-tight encapsulation of said tape and said wire along said location, upon the curing of said sealant.

The present invention has the advantages of melting and dissipating the ice or snow accumulation on a windshield and of preventing the icing adherence of a windshield wiper to the windshield glass and to prevent the icing shut of an otherwise moveable vehicle door glass window.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing wherein similar characters denote similar elements throughout the several views:

FIG. 1 shows a front view of an automotive vehicle windshield with the deicer device of the invention attached thereto;

FIG. 2 shows a section view of the windshield along line 2—2 of FIG. 1;

FIG. 3 shows an enlarged section view of the deicer device of FIG. 2;

FIG. 5 shows a perspective view of the individual elements being assembled into the laminated deicer device of the invention;

DETAILED DESCRIPTION OF PREFERRED EMBODIMENTS

Figure 4:
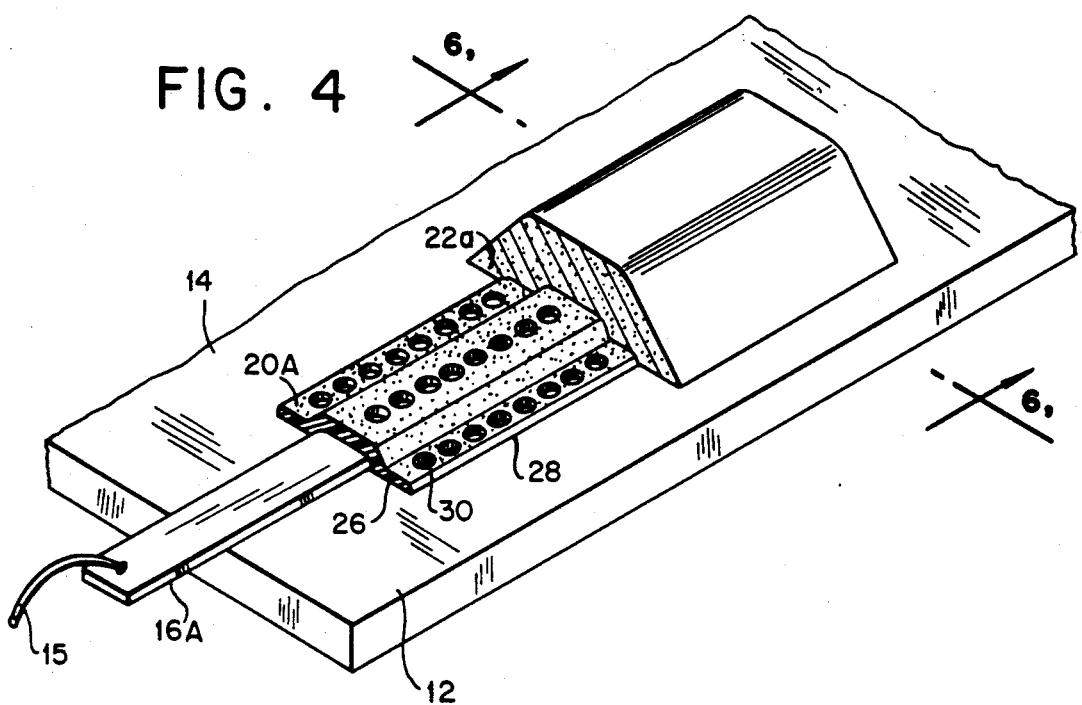
FIG. 4 shows a perspective view, partially broken away, of another embodiment of the deicer device in which the adhesive tape has perforations therethrough.

As shown in FIG. 1, there is a deicer device 10 for heating and deicing the window glass 12 of an automotive vehicle (not shown) which includes a vehicle window glass 12 having an exterior layer 14. An electric resistance heating wire 16 is disposed on the exterior layer 14 of the glass 12 and the wire is positioned along a zone 18 at which ice or snow would naturally collect, if ice or snow were precipitated onto the glass, and if a windshield wiper blade were in motion and by the movement of this blade were to push the precipitating ice and snow down to the bottom part of the windshield, or window glass.

FIG. 2 shows a section view of the window, or windshield of FIG. 1 along line 2—2 of FIG. 1. The window glass 12 is shown positioned between the hood 2 of the vehicle and somewhat above the cowl 4 of the vehicle and adjacent to the dash 6 of the vehicle with the glass held in place by an adhesive sealant 8.

FIG. 3 shows a enlarged partial section view of the deicer device in place on the glass window or windshield as shown in FIG. 2. From FIG. 3, it can be seen that the deicer device further includes an electrically non-conductive adhesive tape 20 placed over the wire 16 for holding the wire along the zone 18 at which the precipitation would collect, and for attaching the wire to the exterior layer 14 of the glass. An electrically non-conductive curable sealant 22 is placed over the adhesive tape 20 on the exterior layer of the glass for providing a water-tight encapsulation of the tape 20 and the wire 16 along the zone 18, upon the curing of the curable sealant. The sealant used is a conventional sealing material, such as a urethane adhesive, which is known in the art.

The window glass 12 could be located in the rear window of a vehicle, and therefore it would be stationary, or it could be located in the side window of a vehicle and therefore moveable, or the glass window could be for the front windshield of a vehicle. In each case the deicing device would be located on the exterior surface of the window. If the deicer device is located on the front windshield or on the rear window of a vehicle, it could be used along with a windshield wiper blade 24 which would be positioned along the location on the windshield or window and be able to contact the sealant.

FIG. 4 shows a partial cut-away view of another embodiment of the deicer device of the invention. In this embodiment, the electrically non-conductive adhesive tape 20A has a top surface 26 in contact with the electrically non-conductive sealant 22, a bottom surface 28 in contact with the exterior surface 14 of the glass, and a plurality of perforations or holes 30 through the tape connecting the top surface 26 with the bottom surface 28. FIG. 4 also shows that the sealant 22, which is in contact with the top surface 26 of the tape 20, extends from the top surface 26 through the holes 30 in the tape. The sealant then extends from the holes 30 in the tape 20 directly to the exterior surface 14 of the window glass 12. A mechanical interlock will be formed between the sealant 22, the tape 20A and the window glass 12 through the holes 30 in the tape, upon the curing of the sealant. FIG. 4 also shows a lead wire 15 for electrically connecting the heating wire 16 to a source of electrical energy (not shown), such as the automotive electrical system powered by a battery.

FIG. 5 shows a perspective view of the method by which the sandwich and layering effect of the laminated deicer device is manufactured. The wire 16 is placed next to the exterior surface of the glass after which the adhesive tape 20 is applied to hold the wire in position at the desired location, after which the curable sealant 22 is placed over so as to encapsulate both adhesive tape and the wire along the desired location on the exterior surface of the window. Then, the curable adhesive is given the desired treatment so as to cause the curing thereof in order to produce the cured sealant 22.

Figure 6:
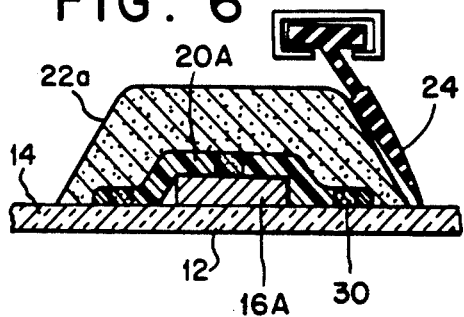
FIG. 6 shows a partial section view of the deicer device along line 6—6 of FIG. 4 in which the sealant is trapezoidal shaped.

FIG. 6 shows the embodiment in which the curable adhesive, after having been cured, is trapezoidal in shape 22a.

Figure 7:
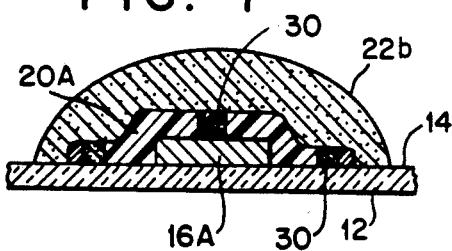
FIG. 7 shows a partial section view of the deicer device along line 7—7 of FIG. 4 in which the sealant is arcuate shaped.

FIG. 7 shows another embodiment in which the cured sealant is arcuate shaped 22b.

Figure 8:
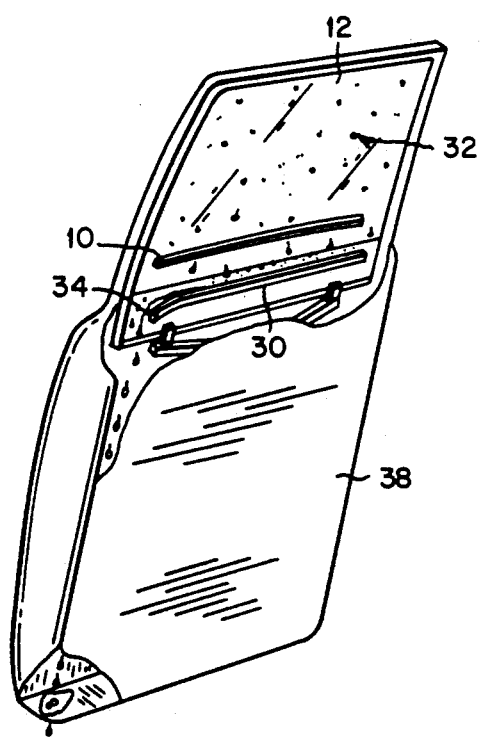
FIG. 8 shows a perspective view of the combination of the deicer device of the invention used with a drainage guide for an automobile window.

FIG. 8 shows a perspective view of the combination of deicer device 10 according to the invention utilized with a drainage guide 30 for an automobile window. An example of this drainage guide for an automobile window is shown and described in Applicant's copending U.S. patent application Ser. No. 419,888, filed Oct. 11, 1989, now U.S. Pat. No. 4,962,601. The disclosure of this application is herewith incorporated by reference. The precipitation 32 which strikes the glass 12 of the window located within the door falls to contact deicer 10 which will melt any of the solid precipitation. The melted precipitation then flows down to the drainage guide 30 and is conducted away from the drainage guide at end portion 34 as a liquid which drips down to the exit opening 36 within the automobile door 38.

Various modifications to the invention may be made, as will be apparent to those skilled in the art. For example, the device of the present invention coupled with a windshield moisture sensor, such as disclosed in U.S. Pat. Nos. 4,831,493 and 4,805,070, so as to activate the devices immediately upon the onset of a snow storm, or the like. In addition, the devices could be electrically coupled to a power source via the electrical connection disclosed in my copending application entitled "An Improved Weatherproof Vehicle Rear Window Defroster Electrical Connection," filed Jan. 20, 1990 under Ser. No. 468,020, now U.S. Pat. No. 4,997,396 which is incorporated by reference hereto.

While only two embodiments of the present invention have been shown and described, it is to be understood that many changes and modifications may be made thereunto without departing from the spirit and scope of the invention, as defined in the appended claims.

What is claimed is:

1. A deicer device for heating and deicing the window glass of a vehicle comprising
    a vehicle window glass having an exterior surface;
    an electric resistance heating wire disposed on said exterior surface of said glass and positioned along a zone at which ice or snow would collect if said ice or snow were precipitated onto said glass and which is outside the normal range of vision through the glass;
    an electrically non-conductive adhesive tape placed over said wire holding said wire along said zone and attaching said wire to the exterior surface of the glass;
    an electrically non-conductive sealant placed over said adhesive tape on said exterior surface of said glass completely covering said tape and said wire and providing a water-tight encapsulation of said tape and said wire along said zone; and terminal means provided on the ends of said wire for supplying power thereto.

2. The device of claim 1, wherein said window glass is for the rear window of a vehicle.

3. The device of claim 2, further comprising at least one windshield wiper blade positioned along said location on said rear window and being able to contact said sealant.

4. The device of claim 1, wherein said window glass is for the side window of a vehicle.

5. The device of claim 1, wherein said window glass is for the front windshield of a vehicle.

6. The device of claim 3, further comprising at least one windshield wiper blade positioned along said location on said front windshield and being able to contact said sealant.

7. The device of claim 1, wherein said adhesive tape has a top surface in contact with said sealant, a bottom surface in contact with said exterior surface of the glass and a plurality of holes through said tape connecting said top surface with said bottom surface; and
- further comprising said sealant contacting said top surface of said tape, said sealant extending from top surface through said holes in the tape, and said sealant extending from said holes in said tape directly to said exterior of said window glass, and
- a mechanical interlock being formed between the sealant, the tape and the window glass through the holes in the tape.

8. The device of claim 1, wherein said sealant is trapezoidal shaped in transverse cross-section.

9. The device of claim 1, wherein said sealant is arcuate shaped in transverse cross-section.

* * * * *